No. 857,102.  
PATENTED JUNE 18, 1907.

J. R. PARANT.

CHANGE SPEED AND REVERSING GEAR.

APPLICATION FILED JAN. 17, 1907.

Witnesses:

Inventor:
Jules R. Parant,
By
Attorney

THE NORRIS PETERS CO., WASHINGTON, D. C.

UNITED STATES PATENT OFFICE.

JULES RENÉ PARANT, OF NEUILLY-SUR-SEINE, FRANCE.

CHANGE-SPEED AND REVERSING GEAR.

No. 857,102.  Specification of Letters Patent.  Patented June 18, 1907.

Application filed January 17, 1907. Serial No. 352,806.

*To all whom it may concern:*

Be it known that I, JULES RENÉ PARANT, a citizen of the Republic of France, residing at Neuilly-sur-Seine, in the Republic of France, have invented certain new and useful Improvements in Change-Speed and Reversing Gears, of which the following is a specification.

This invention relates to change speed and reversing gears of which the essential characteristic consists in the movement being transmitted to the driven shaft, whether differential or other, solely by means of a pinion arranged in combination with the driving shaft in such manner that it can be either rendered independent of the same for reduced speeds or be secured to it for high speed which is thus transmitted in direct engagement, but without any division of the said driving shaft; in every case the wheel gear in action being the only one that is moving the others remaining disengaged and standing still.

Figure 1:
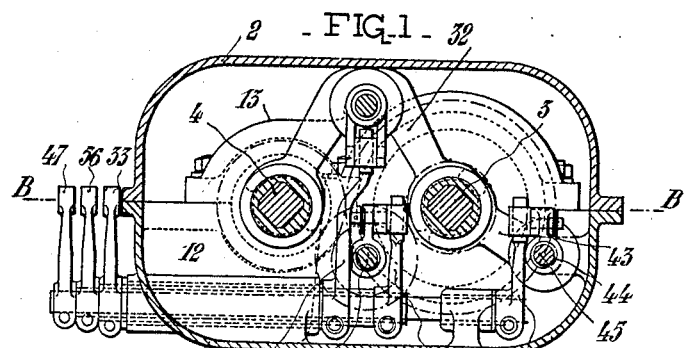
Figure 2:
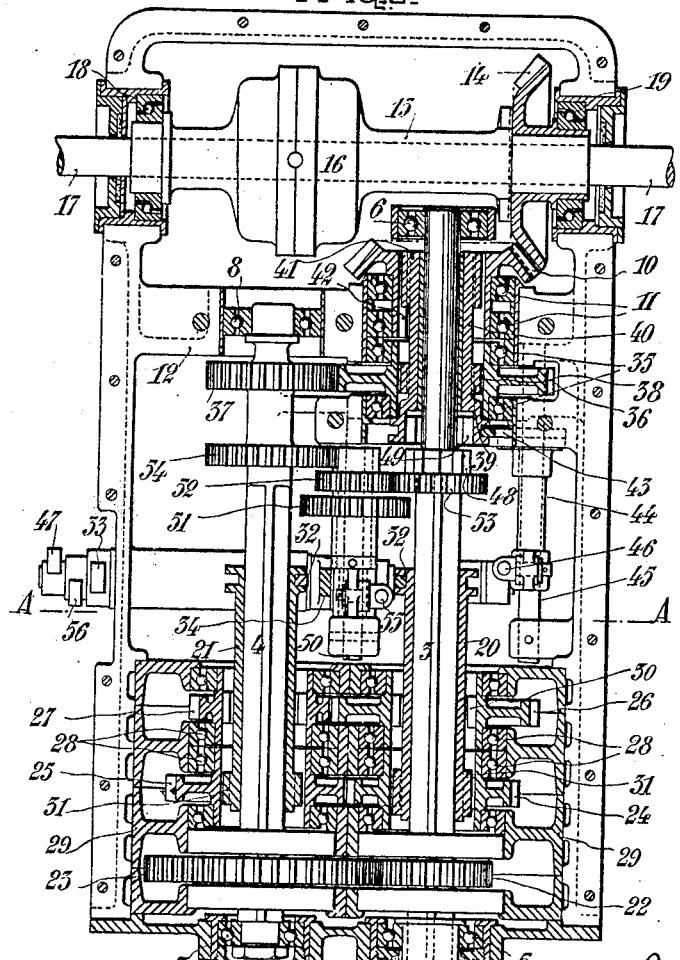

In the accompanying drawing:—Figure 1 is a vertical section of the mechanism on line A—A of Fig. 2, which itself is a horizontal section on line B—B of the said Fig. 1.

This mechanism comprises a gear casing made in two adjustable parts, bottom 1 and cover 2, in which all the operative parts are mounted, more particularly two parallel shafts 3 4 supported respectively at their ends by ball bearings 5, 6 and 7, 8.

The shaft 3 can be connected by means of a square sleeve 9 with which it is provided, and by any suitable means, to the driving shaft. At its end opposite the square sleeve 9, the shaft 3 passes freely through the hub of a pinion 10 which rotates concentrically with, and independently of, the said shaft 3; this pinion engages by means of the outer circumference of its hub, with ball bearings 11 fitted between the corresponding portions of a wall 12 of the gear case, and of a strap 13 secured to the said wall, independently of the cover 2. The pinion 10 engages with another pinion 14 secured to the driven shaft 15, which in the example illustrated, is a sleeve formed integral with the casing of the differential gear 16 of a motor car. The sleeve or hollow spindle 15, in which rotate the sections of the shaft 17, itself rotates freely in the ball bearings 18 19 mounted in the gear case.

The two shafts 3 and 4 are each made along a portion of their length of square cross-section, on which can slide freely two sleeves 20 21 which are thus caused to participate in the movement of rotation of the said spindles.

In the example illustrated, the gears for the various reduced speeds are constituted by toothed wheels which are always in engagement: 22 23 for the first speed, 24 25 for the second, 26 27 for the third etc., the diameters of the said wheels being proportioned accordingly. The said wheels are mounted in such manner that they are disengaged from and independent of the shafts 3 and 4, passing through them, and are supported by the outer circumference of their hubs, resting on ball bearings 28 fitted in independent rings 29 adjustable in the gear case.

In order to connect each gear couple, first to the driving shaft 3, and then to the intermediate shaft 4, the hubs of the wheels 22 to 27, are provided inside with recessed nuts 30, with which can engage corresponding nuts 31 made at one end of each of the sleeves 20 and 21.

The movements along their respective shafts of the said two sleeves 20 21 are brought about simultaneously by means of a double fork 32 which can be operated from the outside by means of a lever 33 acting on an inner finger 34.

The transmission of the driving movement at reduced speed to the driven shaft 15, takes place in the following manner.

Behind the pinion 10, and concentrically with the driving shaft 3, is mounted loose on the said spindle, by means of ball bearings 35 supporting the outer circumference of its hub, a toothed wheel 36 engaging with another wheel 37 secured to the intermediate shaft 4. At its inner circumference, the wheel 36 is provided with a recessed nut 38 with which co-operates another nut 39 formed on a sleeve 40 loosely mounted on the plain portion of the driving shaft 3, the said sleeve always remaining in engagement with the hub of the pinion 10, but being capable of sliding in the interior of the same. To this end the sleeve 40 is provided with another nut 41, capable of longitudinally sliding along corresponding portions of a grooved nut 42, formed on the interior of the pinion 10, without getting out of engagement with the said nut 42 in any position which the said sleeve 40 can occupy. Longitudinal movements of the sleeve 40 are obtained by means of a fork 43, secured to a sleeve 44 capable of sliding in a direction parallel to the shaft 3, on a fixed rod 45, and operated from the outside by means of a lever 47.

When the fork 43 is operated in such manner that the nut 39 of the sleeve 40 is brought into engagement with the nut 38 of the wheel 36, the latter is connected to the pinion 10, in such manner that the reduced speed, which is being transmitted to the intermediate spindle 4 by that set of toothed wheels which at that time is in engagement with the shafts 3 and 4, will be transmitted to the driving shaft through the wheels 37 36 and the pinions 10 14.

When it is desired to obtain top speed by direct engagement, a nut 48 formed on the driving shaft 3, is brought into engagement with another nut 49 formed in the interior of the sleeve 40. In the position which is then occupied by the parts, the pinion 10 still remains in engagement with the sleeve 40 which is then disengaged from the wheel 36, so that the intermediate shaft 4 and the parts supported by it, are not in connection with the driving shaft 3, and remain standing still.

The transmission of movement in direct engagement, is therefore, obtained by means of a spindle made in one piece, passing right through the pinion receiving the movement, to which it is connected by a coupling sleeve, the special and characteristic combination of which enables the said driving shaft to be disengaged from the pinion for transmitting movement at reduced speed, as already explained.

Backward driving is obtained by the combination of parts hereinafter described which remain disengaged from and independent of all the other parts for speeds in forward driving.

On a rod 50, suitably supported in fixed position in the gear case, can slide a gear of two toothed wheels 51 52, intended respectively to engage, at the moment of reversing, the wheel 51 with a pinion 53 keyed to the driving shaft 3, and the wheel 52 with another pinion 54 secured to the intermediate shaft 4.

The shifting of the wheel gearing 51 52, is effected by means of a finger 55 operated from the outside by the central lever 56.

In the position into which the wheels 51 52 are brought for reversing, the sleeve 40 is disengaged from the driving shaft 3 and brought into engagement with the intermediate wheel 36 of reduced speeds.

What I claim as my invention and desire to secure by Letters Patent is:

1. In a change speed and reversing gear and in combination a driven shaft, a toothed wheel thereon, a second toothed wheel in constant engagement therewith, a third toothed wheel adapted to be driven through a reducing speed gear, a driving shaft in one piece passing through the hubs of said second and third wheels but not in contact therewith, a sleeve loosely mounted on said driving shaft and extending between said shaft and the hubs of said second and third wheels, in constant operative connection with said second wheel and adapted to be placed in operative connection either with said third wheel or with the driving shaft, and means under the control of the operator to give longitudinal movement to said sleeve to place it as desired in either of said operative positions.

2. In a change speed and reducing gear and in combination a driven shaft, a toothed wheel fixed thereon, a driving shaft in one piece, a second toothed wheel at one end of said shaft concentric thereto with a hub surrounding said shaft but not in contact therewith and supported by ball bearings on the exterior of its hub, a third toothed wheel mounted adjacent to and in similar manner to said second wheel, a sleeve mounted loosely on said driven shaft extending within the hubs of said wheels, engaging means between said sleeve and the hub of said second toothed wheel so that they always rotate together but the sleeve is capable of longitudinal movement relatively to said wheel hub, means to engage said sleeve and said third toothed wheel at a certain longitudinal position of said sleeve, means to engage said sleeve with the shaft to rotate therewith, means controlled by the operator to move said sleeve longitudinally to engage it either with said third wheel or with the shaft, an intermediate shaft, a toothed wheel on said shaft in constant engagement with said third toothed wheel, a series of reducing gears each comprising two toothed wheels in constant engagement one with the other and mounted respectively concentric to and surrounding the intermediate shaft and the driving shaft, but not in contact therewith and supported on ball bearings engaging the exterior of their hubs, two sleeves mounted respectively on said driving shaft and said intermediate shaft so as to rotate therewith and be capable of longitudinal movement thereon, each sleeve extending within the hubs of the respective toothed wheels of said reducing gears, engaging means between each sleeve and the hubs of the respective toothed wheels so arranged that longitudinal movement of each sleeve places it in engagement with one of the wheels, and means under the control of the operator to shift both of said sleeves.

3. In a change speed and reducing gear and in combination a driven shaft, a toothed wheel fixed thereon, a driving shaft in one piece, a second toothed wheel at one end of said shaft concentric thereto with a hub surrounding said shaft but not in contact therewith and supported by ball bearings on the exterior of its hub, a third toothed wheel mounted adjacent to and in similar manner to said second wheel, a sleeve mounted loosely on said driven shaft extending within the hubs of said wheels, engaging means between said sleeve and the hub of said second toothed wheel so that they always rotate together but the sleeve is capable of longitudinal movement relatively to said wheel hub, means to engage said sleeve and said third toothed wheel at a certain longitudinal position of said sleeve, means to engage said sleeve with the shaft to rotate therewith, means controlled by the operator to move said sleeve longitudinally to engage it either with said third wheel or with the shaft, an intermediate shaft, a toothed wheel on said shaft in constant engagement with said third toothed wheel, a series of reducing gears each comprising two toothed wheels in constant engagement one with the other and mounted respectively concentric to and surrounding the intermediate shaft and the driving shaft, but not in contact therewith and supported on ball bearings engaging the exterior of their hubs, two sleeves mounted respectively on said driving shaft and said intermediate shaft so as to rotate therewith and be capable of longitudinal movement thereon each sleeve extending within the hubs of the respective toothed wheels of said reducing gears, engaging means between each sleeve and the hubs of the respective toothed wheels so arranged that longitudinal movement of each sleeve places it in engagement with one of the wheels, means under the control of the operator to shift both of said sleeves, a reversing gear comprising a toothed wheel on the driving shaft and one on the intermediate shaft and wheels carried on an independent shaft adapted under the control of the operator to place said toothed wheels in operative connection.

In testimony whereof I have signed my name to this specification in the presence of two subscribing witnesses.

JULES RENÉ PARANT.

Witnesses:
H. C. COXE,
GEORGES BONNEUIL.